(12) United States Patent
Streetman

(10) Patent No.: US 6,372,979 B1
(45) Date of Patent: Apr. 16, 2002

(54) APPARATUS AND METHOD FOR CONVERTING ARTIFICIALLY GENERATED RADIANT ENERGY TO ELECTRICAL ENERGY

(76) Inventor: Foy Streetman, 401 Chickasha Ave., Chickasha, OK (US) 73023

( * ) Notice: Subject to any disclaimer, the term of this patent is extended or adjusted under 35 U.S.C. 154(b) by 0 days.

(21) Appl. No.: 09/609,587

(22) Filed: Jun. 30, 2000

(51) Int. Cl.$^7$ .............................................. H01L 31/058
(52) U.S. Cl. ...................... 136/253; 136/244; 136/246; 136/251; 136/259; 136/250
(58) Field of Search ................. 136/253, 244, 136/246, 251, 259, 250

(56) References Cited

U.S. PATENT DOCUMENTS

| | | | | |
|---|---|---|---|---|
| 3,331,707 A | * | 7/1967 | Werth ........................ 136/253 |
| 3,483,040 A | * | 12/1969 | Parkins ....................... 136/253 |
| 4,584,426 A | * | 4/1986 | Nelson ........................ 136/253 |
| 4,776,895 A | * | 10/1988 | Goldstein ................... 136/253 |
| 5,560,783 A | * | 10/1996 | Hamlen ...................... 136/253 |

FOREIGN PATENT DOCUMENTS

DE         3936661 A1  *  5/1991

* cited by examiner

Primary Examiner—Alan Diamond
(74) Attorney, Agent, or Firm—R. William Graham

(57) ABSTRACT

An apparatus is provided for generating electrical energy. The apparatus consists of a housing; particularly, a housing having a spherical surface; a natural gas light for generating radiation capable of being converted to electrical energy; and a plurality of photovoltaic cells for converting the radiation by the natural gas light to electrical energy.

29 Claims, 2 Drawing Sheets

APPARATUS AND METHOD FOR CONVERTING ARTIFICIALLY GENERATED RADIANT ENERGY TO ELECTRICAL ENERGY

BACKGROUND OF THE INVENTION

The present invention relates generally to photovoltaic solar cells, and more particularly the invention relates to an apparatus and method for converting radiant energy to electrical energy employing as the source of radiant energy, a natural-gas light or solar radiation.

Semi-conductor photovoltaic cells which respond to solar radiation and generate an electrical charge or current are well known. U.S. Pat. No. 4,357,400, for example, discloses a photovoltaic cell which is used with an electrolytic solution for generating electrical energy wherein a plurality of discrete semiconductor bodies are positioned on two conductive layers and radiation is transmitted through the electrolytic material to the semiconductor bodies to create a voltage differential and the electrolytic material provides a conductive path between the semiconductor bodies.

Because of the continued increase in population and the growing technical advances there is a proportional demand for electrical energy. Much of this increased energy is expected to be derived from solar radiation, however technology in harnessing solar energy to produce electricity is not keeping pace for the demand. While solar energy is considered to be one of the best alternative sources of energy for the future, its effectiveness is predicated on radiation provided by the sun which, of course, can be relied upon only a few hours every day at best to provide the necessary radiation. Therefore, apparatuses for converting radiation from sunlight to various forms of energy is not only dependent upon the cyclic rising and setting of the sun but also upon weather conditions during daylight hours wherein radiation from sunlight may severely diminished or completely obscured. Therefore, there is a need for an apparatus which can overcome such inadequacies.

SUMMARY OF THE INVENTION

In accordance with the present invention there are several objects and advantages provided herein which include the use of natural gas light as a source of radiation used in conjunction with or an alternative to sunlight radiation.

It is an object of the invention to provide an apparatus for generating electrical energy.

It is another object of the invention to provide an apparatus which employs natural gas light as a source for radiation capable of being converted to electrical.

It is still another object of the invention to provide an apparatus which uses natural gas light in combination with sunlight to generate electrical energy.

One advantage of the present invention is that it provides for continued uninterrupted conversion of radiation to electrical energy over indefinite periods of time.

Another advantage of the present invention is the use of natural gas light radiation to replace sunlight as a source of radiation to replace sunlight as a source of radiation for conversion to electrical energy.

Yet another advantage of the present invention is the use of natural gas light radiation to enhance sunlight radiation in the conversion of radiation to electrical energy.

Still another advantage of the percent invention is the efficiency of a spherical apparatus in utilizing the available radiation for conversion to electrical energy.

Generally, the invention relates to an apparatus for generating electrical energy which comprises a housing, a means for generating radiation capable of being converted to electrical energy, and a photovoltaic cell for receiving radiation and converting the radiation to electrical energy which could then be used as a source of power for lights, heaters, machines, instruments small and large appliances, and various other items requiring an outside source of energy.

One particularly advantageous aspect of the present invention is the use of a natural gas light as the source of radiation capable of being converted to electrical energy, and the use of a housing which has a spherical inner surface for optical conversion of the radiation to electrical energy.

The natural gas light can be used alone to generate the radiation useful in the present invention or it can be used in combination with other generators of radiation such as sunlight.

Other objects and advantages of the present invention will become apparent from the description that follows.

DETAILED DESCRIPTION OF THE INVENTION

Much of the energy consumed in the United States is electrical energy, the majority of which is provided for by burning fossil fuels. However, the continuing depletion of fossil fuel will require that an alternative source be found for generating electric energy. Solar energy is generally considered to be the most likely alternative source for generating elective energy. However, technology is harnessing solar energy to produce electricity has not been effective to overcome the problems associated with converting solar energy to electricity. For example, solar energy is insufficient during non-daylight hours or on cloudy days.

In accordance with the present invention, radiation generated artificially by burning natural gas particularly in a mantle is used to supplement or replace radiation from sunlight to produce electricity.

In one embodiment, the present invention is directed to an apparatus for generating electrical energy which comprises a housing; means for artificially generating radiant energy capable of being converted to electrical energy; and a plurality of photovoltaic cells for receiving and converting the radiant energy to electricity.

The housing is a substrate or matrix which contains the elements for generating radiation and for converting radiation to energy. For example, the housing can be a catalytic heater or burner facing a panel to generate electricity from natural gas. Preferably, the housing is a spherical structure in which a plurality of photovoltaic cells is strategically placed on the inner surface of the housing to receive radiation from a source of radiation wherein the radiation is capable of being converted to electrical energy. One source of radiation capable of being converted to electricity is natural gas light created by burning a mantle into which is fed a flow of natural gas. The natural gas is mixed with oxygen, preferably, for air, initiating radiation which is more energized and therefore more readily converted to electricity when the radiation impinges upon the photovoltaic cells. The housing is a solid material or it may be porous such as a fiber or wire mesh. Typically, the housing is constructed from glass, ceramic or metal.

In another embodiment the present invention is directed to a method for converting artificially generated radiant energy to electrical energy which comprises providing a means for artificially generating said radiant energy and directing said radiant energy to a plurality of photovoltaic cells wherein the radiant energy is converted to electrical energy employing the apparatus described herein.

In the present invention, the radiant energy generated is defined as artificially generated radiant energy as distinguished from natural radiation from sunlight.

Figure 1:
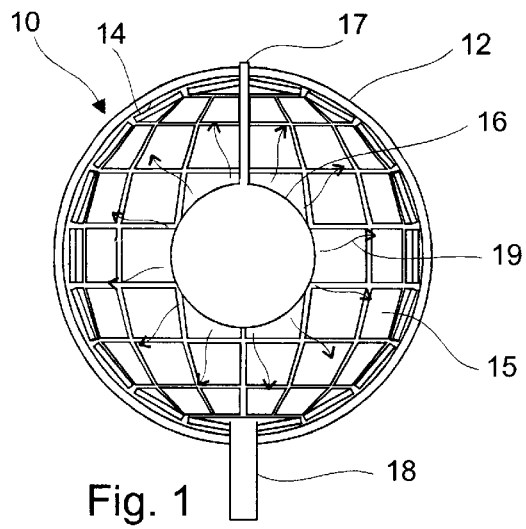
FIG. 1 is a cross-sectional view of a spherical housing in accordance with one embodiment of the invention.

As shown in FIG. 1 of the drawings an apparatus 10 for generating electrical energy includes a housing 12 having a spherical inner surface 14 which is covered with a plurality of photovoltaic cells 15. A mantle 16 is located in the interior of housing 12 and natural gas is supplied to the interior of the mantle 16 through conduit 17. The natural gas is mixed with oxygen (air) supplied through conduit 18 or which permeates through the mantle structure. Typically, the mantle 16 is a porous or open structure made of asbestos or ceramic material. The asbestos or ceramic structure of the mantle 16 during combustion is heated causing the natural gas to disperse in such a pattern that a highly brilliant light is created which is much brighter that from a simple gas burner. Furthermore, the extreme heat created by the mantle 16 behaves much like a catalytic converter on a car muffler to eliminate most undesirable emissions. Radiant energy 19 from the burning of the mantle 16 impinges on the photovoltaic cells where it is converted to electrical energy.

Figure 2:
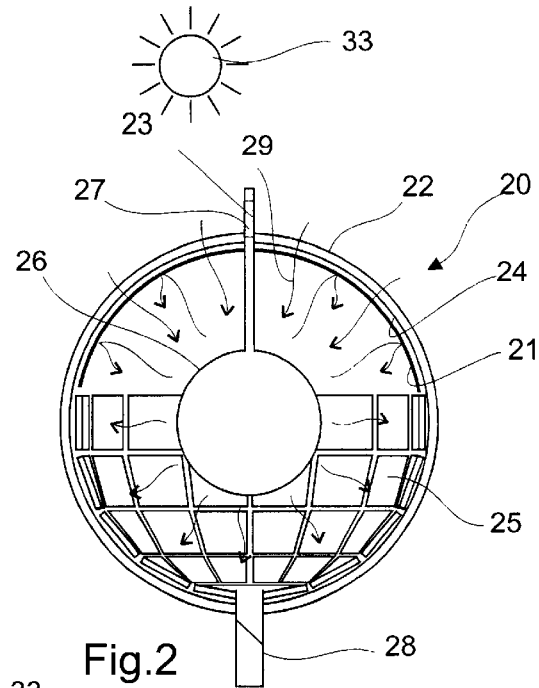
FIG. 2 is a cross-sectional view of a spherical housing in accordance another embodiment of the invention.
Figure 3:
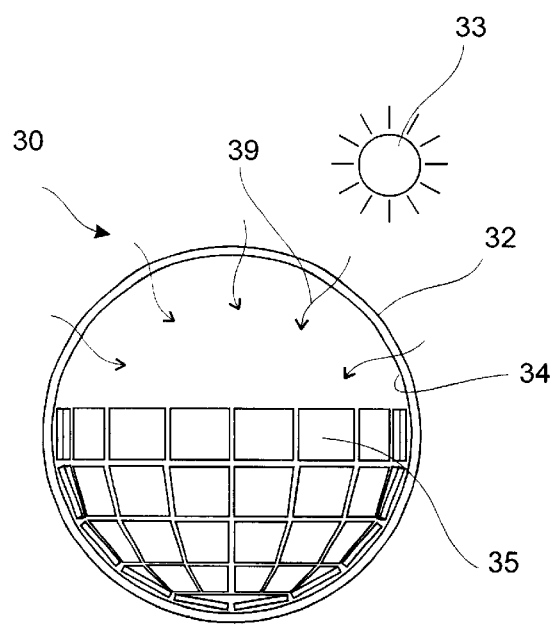
FIG. 3 is a cross-sectional view of a spherical housing in accordance with yet another embodiment of the invention.
Figure 4:
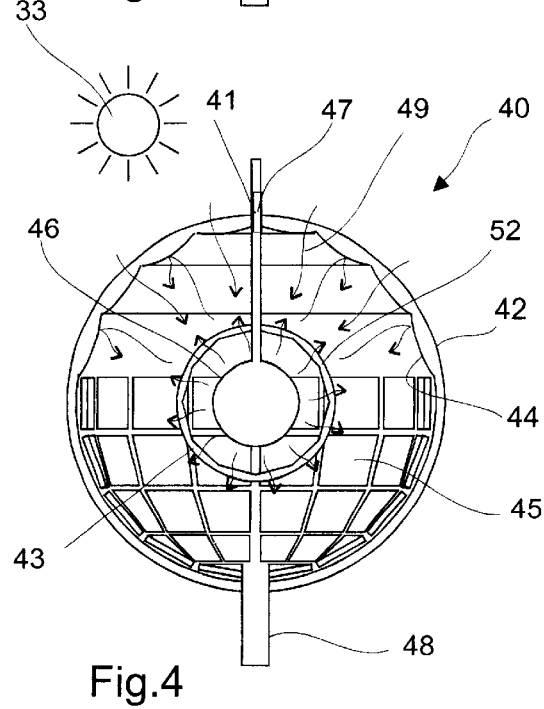
FIG. 4 is a cross-sectional view of a spherical housing in accordance with still another embodiment of the invention.

FIG. 2 illustrates an embodiment of the invention wherein an apparatus 20 for generating electrical energy includes a housing 22 having a spherical inner surface 24. In this embodiment, photovoltaic cells 25 cover at least a portion of the spherical inner surface 24. The remaining portion of the spherical inner surface 24 is substantially free of photovoltaic cells and this portion of the housing 22 is also transparent to radiation 29 generated by sunlight outside the apparatus 20. The housing 22 may further include a reflective material 21 on at least a portion of the inner surface of the housing, such that radiation 29 generated inside the housing 22 ,e.g., by the mantle 26, is reflected by the reflective material 21 to the photovoltaic cells. Accordingly, the apparatus shown in FIGS. 2–4 is capable of utilizing a radiation source 33 which may be natural radiation such as sunlight and/or artificial radiation such as from natural gas light. A mantle 26 is fueled by natural gas supplied through conduit 27 combined with air supplied through conduit 28. The flow of natural gas supplied through conduit 27 may be reduced or cut off by valve 23 which may operate by electricity or by pneumatic or hydraulic pressure. Operation of the valve is controlled by a sensor (not shown). The mantle 26 in shown in the interior of the housing 22 in FIG. 2; however, it is within the concept of the present invention to employ the mantle 26 outside the housing 22. This embodiment is illustrated in FIG. 3 where the apparatus 30 includes a housing 32 having a spherical inner surface 34, and a plurality of photovoltaic cells 35 covering at least a portion of the inner surface 34 of housing 32. As shown in FIG. 3, the photovoltaic cells 35 cover substantially about one half of the inner surface 34 of the housing 32 and, since the mantle (not shown) is located outside the housing 32, there is no need for a reflective material covering the inner surface 34 of the housing 32.

FIG. 4 illustrates an apparatus 40 which includes a housing 42 having an inner surface 44 which is shaped to provide magnification of radiation 49 illuminating from external sunlight or mantle 46 thereby intensifying the radiation 49 impinging on the photovoltaic cells 45. An alternative or additional magnifying surface 43 surrounds the mantle 46 for further magnification of the radiation 49 emitted by the mantle 46. The magnifying material used to intensify the radiation may be a structure shaped to provide the desired magnification or it may consist of a plurality of bodies which exhibit magnifying properties such as lens or beads. The magnifying bodies may be present in a variety of sizes and shapes to provide the desired magnification. The magnifying bodies 52 are a series of photovoltaic cells that are transparent or translucent whereby the radiation 49 can also be converted into electricity as it passes through them, and with such additional layers of photovoltaic cells being within the outer wall 42, each could increase the electric output, by the radiation 49 passing through one and then the other of such layers and with layers 52 in FIG. 4 using the power of the radiation as is passes back and forth in the reflective pattern again and again until it is depleted. The mantle 46 is fueled by natural gas supplied through conduit 47 combined with air supplied through conduit 48.

Figure 5:
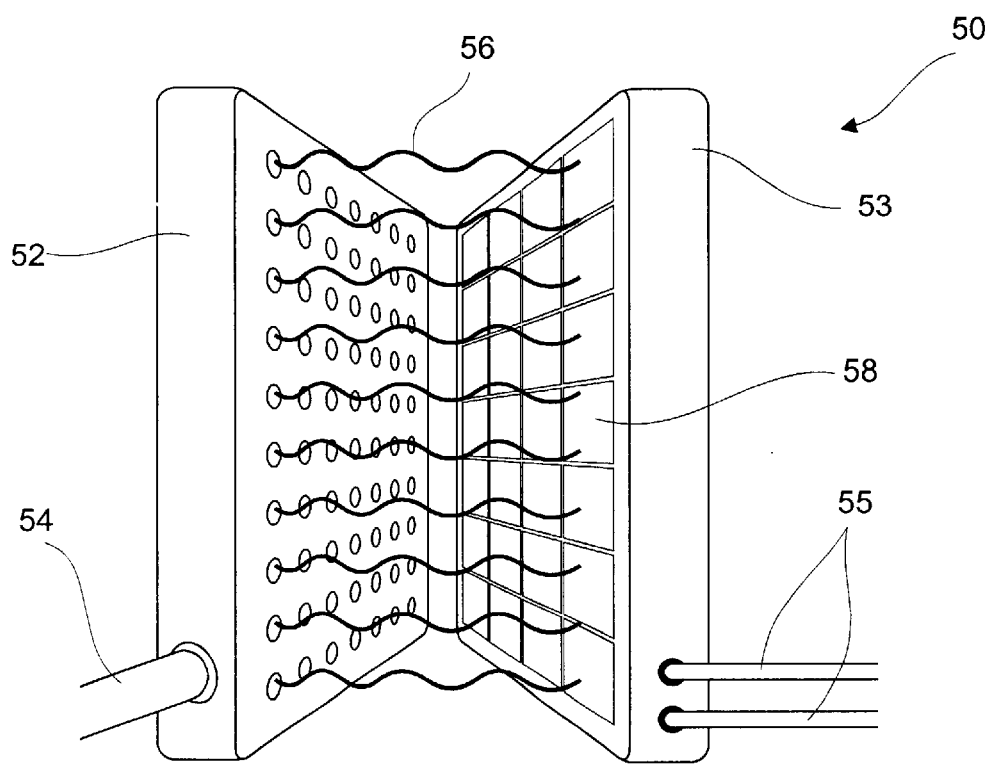
FIG. 5 illustrates a sectional apparatus for emitting radiation and impinging the radiation on a photovoltaic cell to generate electrical energy.

FIG. 5 illustrates an apparatus 50 which contains a catalytic heater 52 provided with fuel from conduit 54. Radiation 56 generated by the catalytic heater 52 impinges on the photovoltaic cells 58 in housing 53 were it is converted to electrical energy. for transmission through lines 55.

Figure 6:
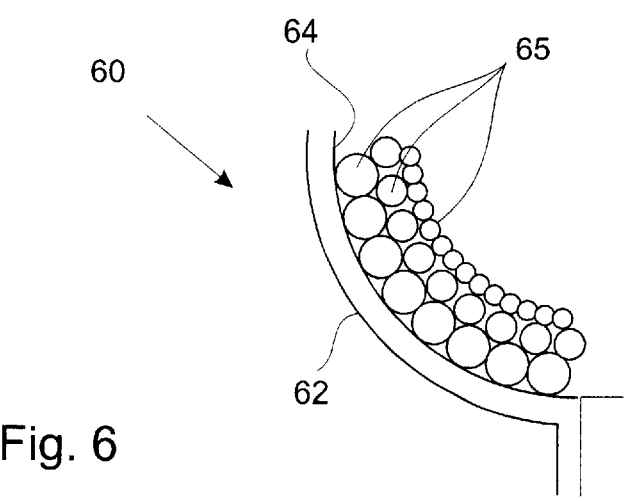
FIG. 6 illustrates a recited view of the spherical housing of the present invention showing the photovoltaic cells as spherical translucent cells of varying diameter.

As shown in FIG. 6, which illustrates another embodiment of the present invention wherein the apparatus 60 is shown in a sectional view, it is within the present invention to include several layers of transparent or translucent solar cells 65, each cell having a spherical shape. Generally, these spherical solar cells will be layered with each layer of cells containing cells of a similar diameter and the cells of each layer being of a diameter smaller or larger than the adjacent layer. Typically, the outer layer of cells on the inner surface 64 of the housing 62 will contain the larger diameter cells with the diameter of the adjacent cells becoming smaller toward the interior of the housing. Such cells may be used alone as the photovoltaic cells or they may be used in combination with other shapes and forms of photovoltaic cells.

From the foregoing, it will be appreciated that other modification and variations of the present invention are possible, and it is therefore, to be understood that any such modifications and variations are intended to be with in the scope of invention as presently and specifically described.

What is claimed is:

1. An apparatus for converting artificially generated radiant energy to electrical energy comprising:

a housing;

means for artificially generating radiant energy capable of being converted to electrical energy; and a plurality of photovoltaic cells for receiving and converting said artificially generated radiant energy to electrical energy wherein said plurality of photovoltaic cells include at least one layer of photovoltaic cells in the form of transparent or translucent spheres.

2. The apparatus of claim 1 wherein said housing has a spherical inner surface.

3. The apparatus of claim 1 wherein said means for artificially generating said radiant energy is a natural gas light.

4. The apparatus of claim 3 wherein said gas light comprises a mantle and a means for supplying natural gas to said gas light.

5. The apparatus of claim 1 wherein at least a portion of said housing in transparent to external radiant energy.

6. The apparatus of claim 1 wherein said housing is made of glass, ceramic or metal.

7. The apparatus of claim 1 wherein at least a portion of said housing has a solid structure.

8. The apparatus of claim 1 wherein at least a portion of said housing has an open cell structure.

9. The apparatus of claim 1 wherein said plurality of photovoltaic cells are mounted on at least a portion of the inner surface of said housing.

10. The apparatus of claim 9 wherein said housing has a reflective surface on at least a portion of the inner surface of said housing free of photovoltaic cells, wherein said reflective surface reflects radiant energy in said housing to said photovoltaic cells mounted on at least said portion of the inner surface of said housing.

11. The apparatus of claim 1 wherein said housing further includes means for magnifying said radiant energy.

12. The apparatus of claim 1 wherein said plurality of photovoltaic cells are in the form of flexible panels.

13. The apparatus of claim 1 wherein said photovoltaic cells are in the form of transparent spheres and said plurality, of photovoltaic cells includes two or more layers of said transparent spheres each layer being of a size distinct from adjacent layers.

14. The structure of claim 1 wherein said means for artificially generating radiant energy capable of being converted to electrical energy is used to complement radiant energy generated by sunlight.

15. The apparatus of claim 10 wherein said housing and said reflective inner surface are transparent to external radiation.

16. An apparatus for converting artificially generated radiant energy to electrical energy comprising:
a housing having a spherical inner surface;
a natural gas light for generating radiant energy capable of being converted to electrical energy wherein said natural gas light is used to complement sunlight in generating radiant energy capable of being converted to electrical energy;
a plurality of photovoltaic cells on at least a portion of the inner surface of said housing, for receiving said radiant energy and converting said radiant energy to electrical energy; and
means for supplying natural gas to said natural gas light.

17. The apparatus of claim 16 wherein said plurality of photovoltaic cells covers the entire inner surface of said housing and said natural gas light for generating said radiant energy is located in the interior of said housing.

18. The apparatus of claim 16 wherein said housing further includes magnifying means for intensifying said radiant energy.

19. The apparatus of claim 16 further including means for supplying oxygen to said natural gas light.

20. The apparatus of claim 16 wherein said housing has a reflective surface on a portion of an inner surface of said housing free of photovoltaic cells.

21. The apparatus of claim 20 wherein said natural gas light is located in the interior of said housing wherein said radiant energy is reflected to and/or directed to said photovoltaic cells.

22. The apparatus of claim 16 wherein said natural gas light is located exteriorly said housing wherein said radiant energy is directed through a radiation-transparent portion of said housing free of photovoltaic cells.

23. The apparatus of claim 1 comprising:
a catalytic heater or burner capable of generating said radiant energy; and
means for powering said catalytic heater or burner.

24. A method for converting artificially generated radiant energy to electrical energy comprising:
providing a housing having a spherical inner surface, said inner surface having disposed thereon a plurality of photovoltaic cells, wherein at least one layer of said photovoltaic cells is in the form of transparent or translucent spheres;
providing a natural gas light capable of generating radiant energy in said housing; and
directing said radiant energy generated by said natural gas light to said plurality of photovoltaic cells to convert said radiant energy to electrical energy, wherein said radiant energy is used to complement natural sunlight to provide electrical energy.

25. The method of claim 24 wherein said natural gas light comprises a mantle and a means for supplying natural gas to said gas light.

26. The method of claim 24 wherein said gas light is interposed interiorly said housing, and said photovoltaic cells are mounted on at least a portion of the inner surface of said housing.

27. The method of claim 26 wherein said housing further includes a reflective surface on at least a portion of said inner surface free of photovoltaic cells wherein said radiant energy is reflected from said reflective surface to said photovoltaic cells.

28. The method of claim 26 wherein said housing further includes magnifying means wherein said radiant energy contacting said magnifying means in intensified.

29. An apparatus for converting artificially generated radiant energy to electrical energy comprising:
a housing having a spherical inner surface;
a natural gas light disposed in said housing for artificially generating radiant energy capable of being converted to electrical energy; means for supplying natural gas to said natural gas light; and
a plurality of photovoltaic cells on said spherical inner surface of said housing, said plurality of photovoltaic cells including at least one layer of photovoltaic cells in the form of transparent or translucent spheres for receiving and converting said artificially generated radiant energy to electrical energy, wherein said artificially generated radiant energy is used to complement sunlight in generating said radiant energy capable of being converted to electrical energy.

* * * * *